(12) United States Patent
Westhoff et al.

(10) Patent No.: US 7,624,992 B2
(45) Date of Patent: Dec. 1, 2009

(54) GASKET PACKAGE

(75) Inventors: James A. Westhoff, Langhorne, PA (US); James A. Kelly, Upper Black Eddy, PA (US); Christopher Handago, Plymouth Meeting, PA (US)

(73) Assignee: A-Lok Products, Inc., Tullytown, PA (US)

( * ) Notice: Subject to any disclaimer, the term of this patent is extended or adjusted under 35 U.S.C. 154(b) by 338 days.

(21) Appl. No.: 11/415,136

(22) Filed: May 1, 2006

(65) Prior Publication Data

US 2007/0252342 A1  Nov. 1, 2007

(51) Int. Cl.
 *F16L 17/00* (2006.01)
 *B65D 85/00* (2006.01)
(52) U.S. Cl. .................................. 277/616; 206/320
(58) Field of Classification Search ......... 277/607–609, 277/616; 206/320, 497, 586
See application file for complete search history.

(56) References Cited

U.S. PATENT DOCUMENTS

| | | | |
|---|---|---|---|
| 3,129,812 A | 4/1964 | Deasy | |
| 3,559,844 A | 2/1971 | Schlosberg | |
| 3,675,933 A | 7/1972 | Nappe | |
| 3,866,925 A * | 2/1975 | Maimstrom et al. | 277/618 |
| 3,958,313 A | 5/1976 | Rossborough | |
| 4,199,157 A * | 4/1980 | Skinner et al. | 277/606 |
| 4,203,190 A | 5/1980 | Temple et al. | |
| 4,478,437 A | 10/1984 | Skinner | |
| 4,538,839 A * | 9/1985 | Ledgerwood | 285/236 |
| 4,903,970 A | 2/1990 | Ditcher et al. | |
| 5,029,907 A | 7/1991 | Gundy | |
| 5,039,137 A * | 8/1991 | Cankovic et al. | 285/236 |
| 5,431,459 A | 7/1995 | Gundy | |
| 5,505,497 A * | 4/1996 | Shea et al. | 285/55 |
| 5,529,312 A | 6/1996 | Skinner et al. | |
| 5,876,039 A | 3/1999 | Skinner et al. | |
| 6,152,455 A | 11/2000 | Brockway et al. | |
| 6,406,025 B1 * | 6/2002 | Westhoff et al. | 277/314 |
| 6,568,691 B1 | 5/2003 | Westhoff et al. | |
| 6,921,085 B2 * | 7/2005 | Mirales et al. | 277/606 |
| 2006/0049627 A1 * | 3/2006 | Happel | 285/230 |

\* cited by examiner

*Primary Examiner*—Vishal Patel
(74) *Attorney, Agent, or Firm*—Fay Sharpe LLP

(57) ABSTRACT

A gasket assembly includes a one-piece gasket that has a mounting end, for mounting in an opening of an associated enclosure body, and a pipe engaging end, for receiving an associated pipe. An intermediate section is located between the mounting end and the pipe engaging end. A clamp assembly is used on the pipe engaging end of the gasket. The clamp assembly is looped to assume an annular configuration. A retaining member, of one piece with the gasket, extends from a wall of the gasket, for retaining the clamp assembly to the gasket in a transport position.

12 Claims, 11 Drawing Sheets

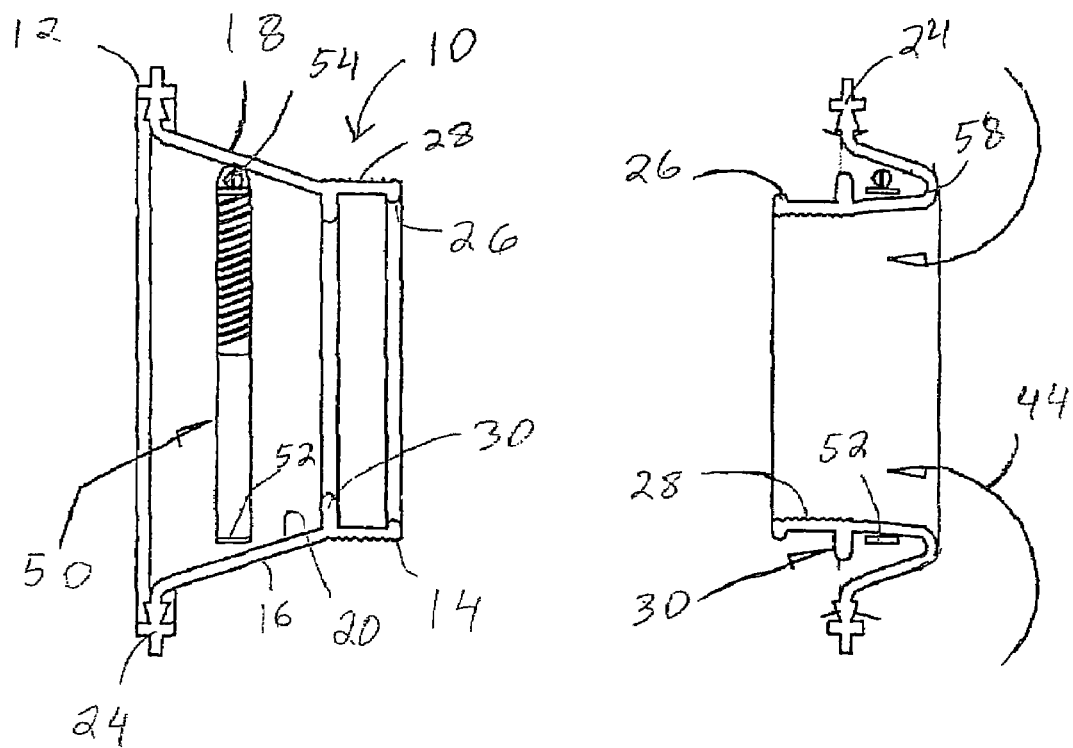
FIG. 1
FIG. 3
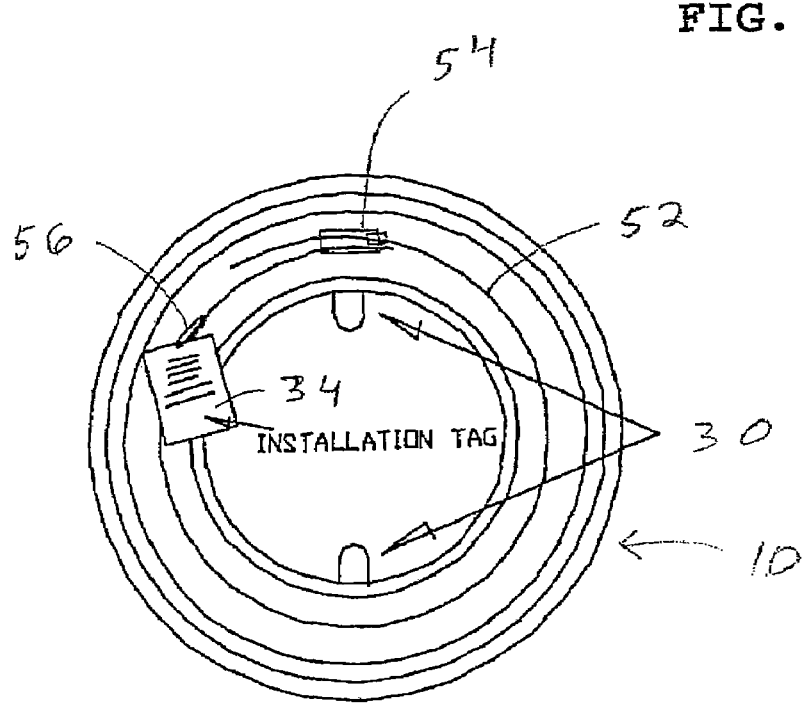
FIG. 2

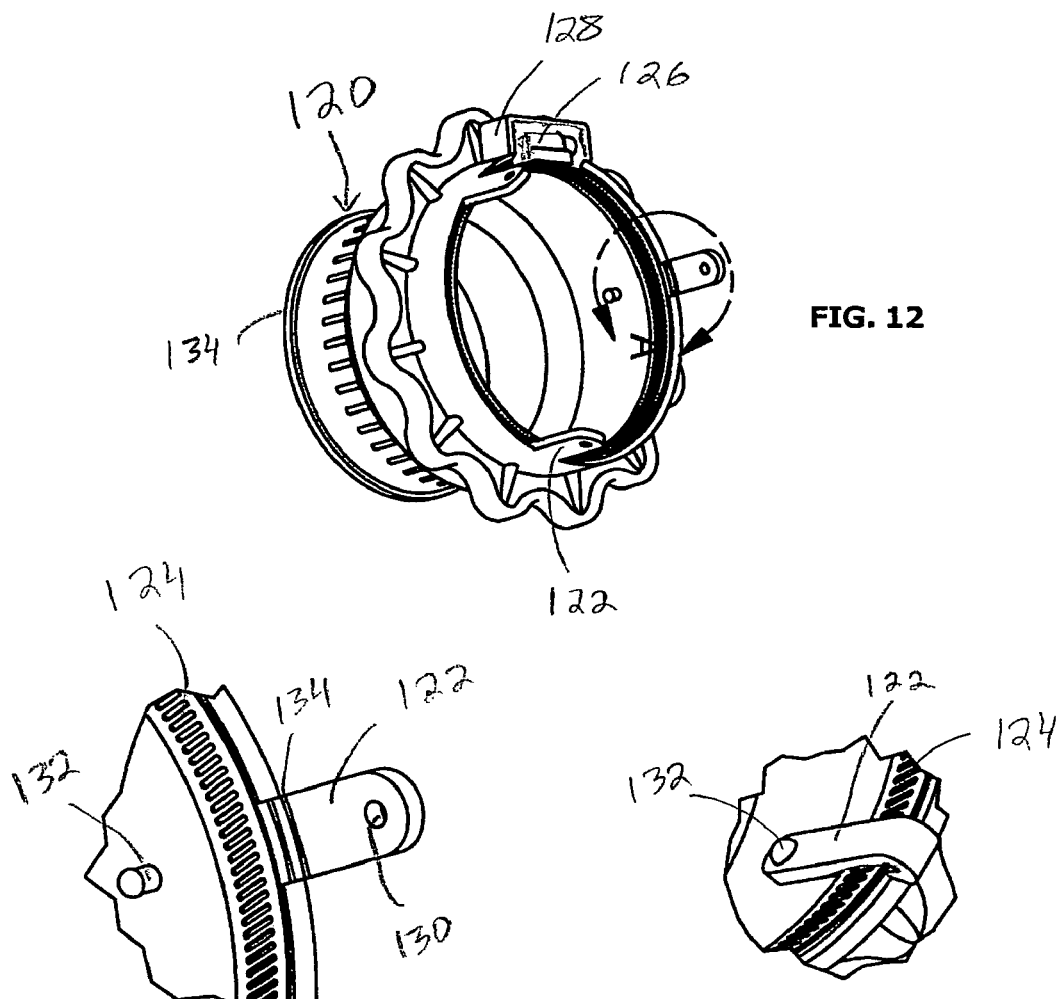
FIG. 12
FIG. 13
FIG. 14
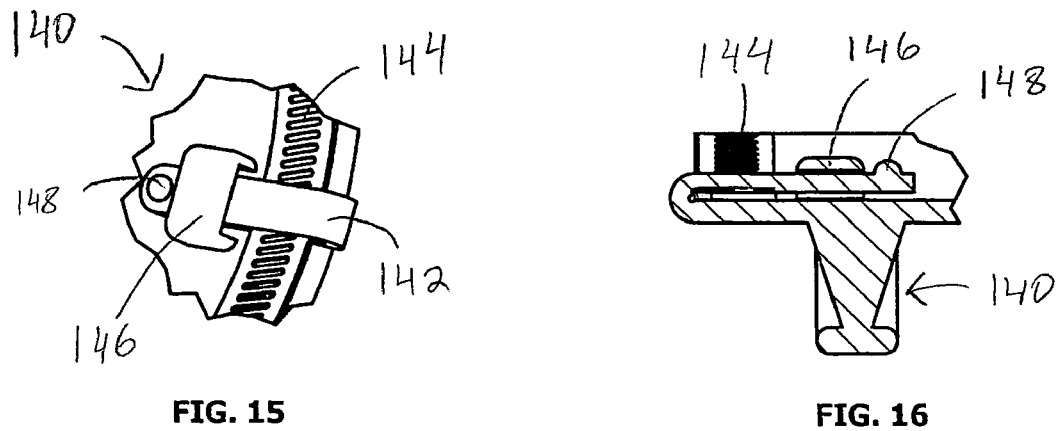
FIG. 15
FIG. 16

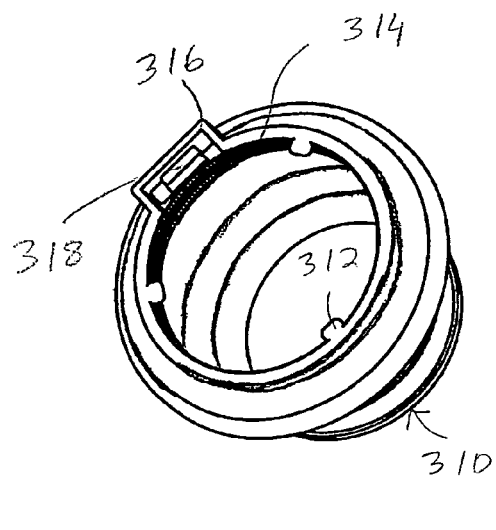
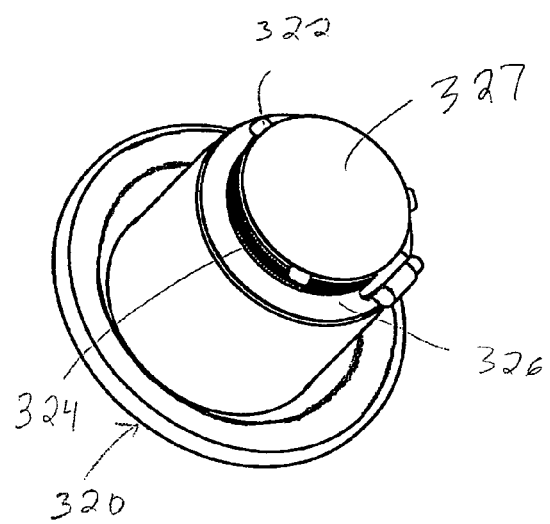
FIG. 28  FIG. 29
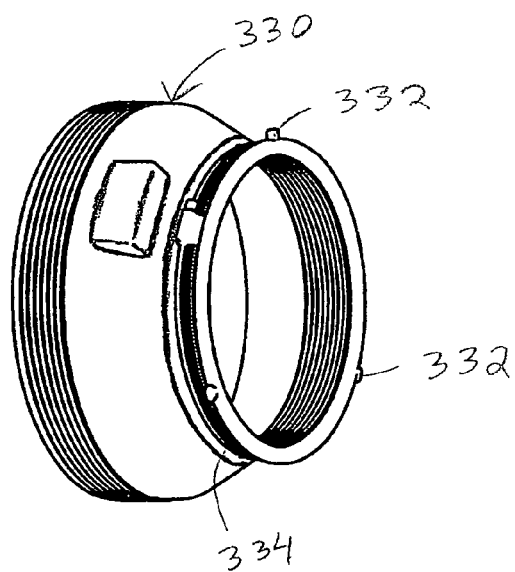
FIG. 30

GASKET PACKAGE

BACKGROUND

The present invention relates to gaskets for use in providing a liquid tight seal between an opening in a side wall and a pipe. More particularly, the invention relates to a packaging arrangement for retaining a clamp assembly with the gasket during transport of the gasket, before it is installed.

SUMMARY OF THE INVENTION

Gaskets or connectors made of rubber, or similar resilient material, are typically utilized in sewage systems for providing a liquid tight seal between a pipe and an opening in a side wall of a cast member, such as, for example, a manhole assembly.

There are two standard techniques for mounting a gasket within an opening in a cast member. First, one can embed an end of the gasket into a cast member during the casting operation. In this manner, the gasket is integrally joined to the cast member during the casting operation as the cast member is being formed, for example, at the factory.

The other technique is to mount the gasket into an opening in a side wall of a cast member. The opening may be either formed during a casting operation or may be formed by the step of coring an opening in a member previously cast prior to installation of the gasket. Gaskets mounted into a cast member after a casting operation are provided with a mounting portion which has a surface designed to make substantially intimate engagement with the surface of the opening. An expansion band is then placed against the interior surface of the gasket mounting portion and is expanded by an amount sufficient to expand the gasket mounting portion and compress it between the expansion band and the opening in the side wall of the cast member. This is sufficient to maintain a liquid tight seal, satisfactory to withstand a given level of pressure, which may be exerted by subsurface water upon the liquid tight seal between the gasket and the cast member.

After the gasket has been mounted, it is ready to receive a pipe, which is inserted into the opposite end of the gasket. The gasket opposite end serves as the pipe engaging portion, the pipe being inserted into the gasket so that the pipe engaging portion encircles the exterior surface of the pipe at that point. In order to assure a proper liquid tight seal, a clamp, sometimes known as a take-down clamp, is placed about the outer periphery of the gasket pipe engaging portion. The clamp is then tightened by an amount suitable to provide the desired liquid tight seal between the gasket and the pipe.

Historically, the gasket and the clamp were shipped to the customer loose, either in a shared packaging or separately. For gaskets which have an end embedded into a cast member, it is common practice in the industry to take the gasket and mount it on hole forming equipment that positions the end to be embedded in the desired location during the casting of precast components in steel shaping molds. After the precast component is adequately cured, the precast producer will demold the component from the steel mold, remove the hole forming equipment and store the precast component. When it comes time to ship the precast component to the job site for installation, the manufacturer must locate and match the correct clamp to the gasket or make provisions for the contractor to do the same so that all gasket components are available at the time of installation. Such installations could be a short distance from the producer of the precast component, or as far as several hundred miles away. It is apparent that there can be much aggravation and expense associated with lost or misplaced clamps, not to mention the liability risk when the contractor goes to the local hardware store to improvise with a clamp that may not be suitable for direct burial.

One known packaging design which reduces the possibility of misplaced or lost clamps is illustrated in U.S. Pat. No. 6,921,085. That patent discloses a package including gasket mounting clamps and instructions for mounting same. The mounting clamps include an expansion clamp and a take-down clamp. The expansion clamp engages an interior of the gasket. The take-down clamp is positioned in the gasket and is urged against a surface of either the expansion clamp or the gasket. A flexible fastener loops through the expansion clamp and around the take-down clamp, also passing through an opening in an instruction card, thereby retaining the card and the take-down clamp within the gasket.

However, in a design where there is no expansion clamp, the take-down clamp could not be easily held within the gasket with such a flexible fastener.

Accordingly, it is desirable to develop a new and improved packaging design for gaskets and clamps which would overcome the foregoing difficulties and others while providing better and more advantageous overall results.

BRIEF SUMMARY OF THE INVENTION

In one embodiment of the present invention, a gasket assembly is provided.

In this embodiment of the invention, the gasket assembly comprises a one-piece gasket including a mounting end for mounting to an opening of an associated enclosure body and a pipe engaging end for receiving an associated pipe. An intermediate section is located between the mounting end and the pipe engaging end. A clamp assembly is provided for use on the pipe engaging end of the gasket. The clamp assembly is looped to assume an annular configuration. A retaining means, of one piece with the gasket, extends from a wall of the gasket, for retaining the clamp assembly to the gasket in a transport position.

According to another aspect of the present invention, a gasket assembly is provided. In this embodiment of the invention, a gasket is made of a resilient material and includes an annular mounting end for mounting to an opening of an associated cast member and a pipe engaging end for receiving an associated pipe. A tapered intermediate section is located between the mounting end and the pipe engaging end. A take-down clamp assembly is used on the pipe engaging end of the gasket. A retaining member, of one piece with the gasket, is used for retaining the take-down clamp assembly to the gasket in a transport position. A bead is located adjacent the pipe engaging end of the gasket for retaining the take-down clamp assembly in a use position.

In accordance with another aspect of the present invention, a gasket assembly is provided for joining together a pipe and an enclosure body, having an opening formed therein. More particularly, in accordance with this aspect of the invention, the gasket assembly comprises a one-piece elastomeric gasket which assumes a first, transport orientation and a second, use orientation. The gasket comprises a larger end for mounting to an opening of an associated enclosure body and a smaller end for receiving an associated pipe. A tapered central section is located between the two ends. A clamping member is provided which, in the use orientation of the gasket extends around the smaller end of the gasket for clamping around the associated pipe. A retaining member, of one piece with the gasket, retains the clamping member to the gasket in the transport orientation of the gasket.

Other benefits and advantages of the present invention will become apparent to those skilled in the art upon a reading and understanding of the following detailed specification.

BRIEF DESCRIPTION OF THE DRAWINGS

The invention may take form in certain components and structures, preferred embodiments of which will be described in detail in this specification and illustrated in the accompanying drawings, wherein:

FIG. 1 is a schematic cross sectional view of a first embodiment of a gasket assembly according to the present invention, in a first orientation;

FIG. 2 is a front elevational view thereof;

FIG. 3 is a side elevational view, in cross section, of the gasket assembly of FIG. 1 in a second orientation

FIG. 12 is a perspective view of a gasket assembly according to a fifth embodiment of the present invention;

FIG. 13 is an enlarged fragmentary view of a portion of the gasket assembly of FIG. 12, illustrating a fastening member in a first orientation;

FIG. 14 is a perspective view of a fastening member of FIG. 13 in a second orientation;

FIG. 15 is a perspective view of a portion of a gasket assembly according to a sixth embodiment of the present invention;

FIG. 16 is a side elevational view in cross section of the embodiment of FIG. 15 reversed;

FIG. 28 is a perspective view of a gasket assembly according to a fifteenth embodiment of the present invention;

FIG. 29 is a perspective view of a gasket assembly according to a sixteenth embodiment of the present invention;

FIG. 30 is a perspective view of a gasket assembly according to a seventeenth embodiment of the present invention;

DETAILED DESCRIPTION

Figure 3A:
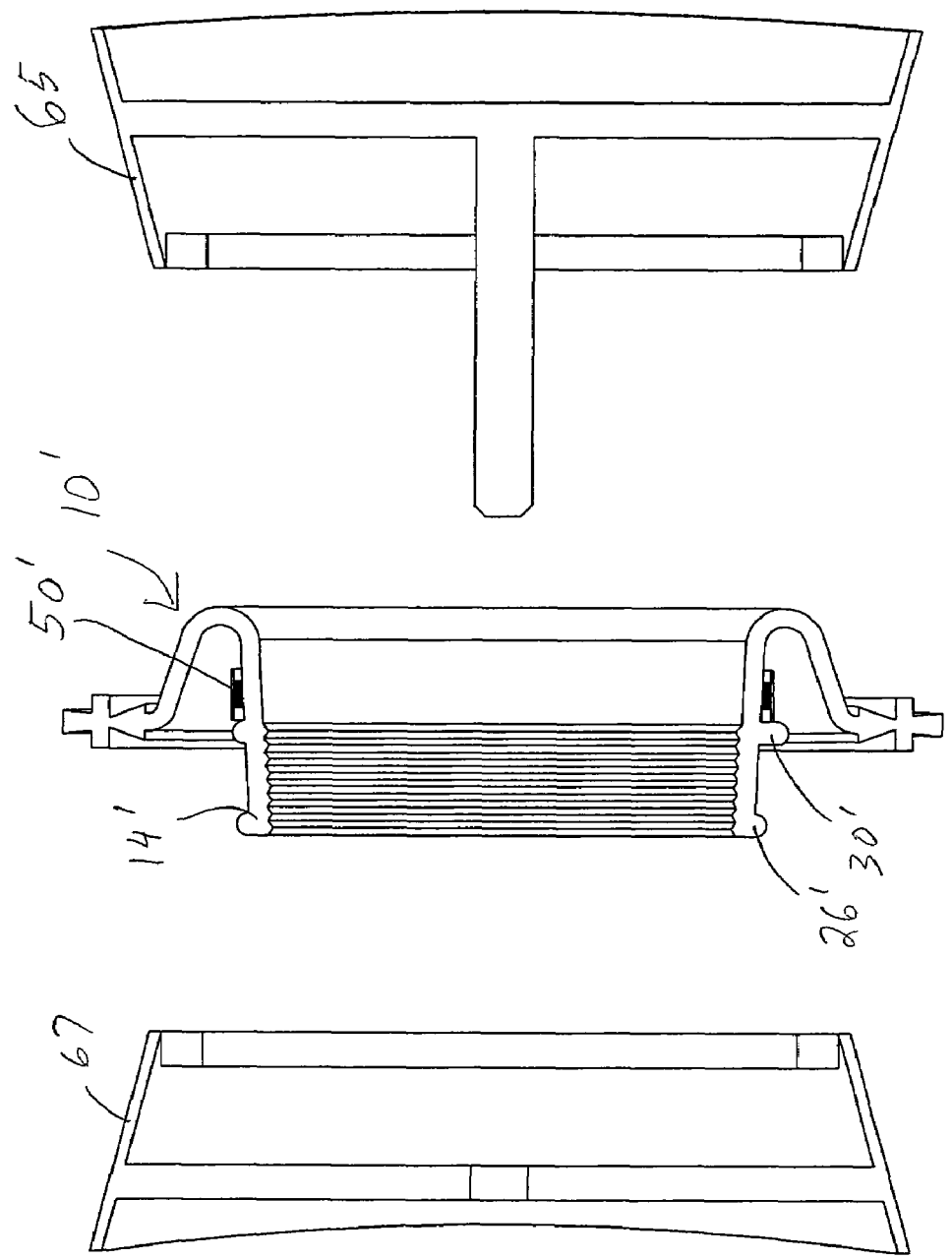
FIG. 3A is a side elevational view in cross section of another gasket assembly, together with a mounting mandrel used in a placement of the gasket in an associated cast member.

Referring now to the drawings, wherein the showings are for purposes of illustrating preferred embodiments of the invention only and not for purposes of limiting same, FIG. 1 illustrated a gasket assembly according to a first embodiment of the present invention. In FIG. 1, a gasket body 10 is provided. The gasket body includes a first or mounting end 12 and a second or pipe engaging end 14. An intermediate portion 16 connects the two ends. As is evident from FIG. 1, the gasket body can have a somewhat tapered configuration. The gasket body also includes a first wall 18 and a second wall 20. The first and second walls 18 and 20 of the gasket can be either the inner wall or the outer wall of the gasket, depending on its orientation. An anchoring projection 24 can be located at the first end 12. The anchoring projection is also sometimes known as the embedment end of the gasket. Located adjacent the second end 14 is a bead 26. While the anchoring projections 24 are located on the first wall 18, it is evident that the bead 26 is located on the second wall 20. Located on the first wall adjacent the second end are a plurality of spaced ribs 28, which can extend circumferentially around the gasket. The gasket 14 is of conventional design and can be formed from a resilient material, such as rubber or a rubber-like material, which is compressible and it can be partially expandable as well.

Spaced from the bead 26 and located on the second wall 20 are tabs 30. As is evident from FIG. 2, in this embodiment, there are two tabs which are spaced from each other by approximately 180° so that the two tabs face each other. Also, an installation tag 34 can be provided for the gasket assembly. After the gasket has been formed, it can be turned inside out. In other words, the gasket is pulled so that the second wall 20 now becomes the outer wall, as the gasket is pulled via arrows 44 in FIG. 3. Now, the bead 26 is located on the outer wall of the gasket and the ribs 28 are located on the inner wall thereof.

Positioned in the gasket, is a take-down clamp assembly 50. The take-down clamp can be a conventional clamp, which finds widespread use through a variety of different industries. It is similar to a tightening clamp used, e.g., in the automotive industry for tightening hoses in vehicles such as cars, trucks or farm equipment. It includes a band 52 and a tightening screw 54. This is tightened conventionally via a torque wrench, or similar tool. The take-down clamp may be formed of plastic, metal or a combination of suitable known non-corrosive materials. The installation tag can be secured to the band 52 via a loop 56 of material that is either part of the tag or is a separate loop fastener of the type illustrated in U.S. Pat. No. 6,921,085. That patent is incorporated hereinto, in its entirety.

As is evident from FIG. 3, when the gasket body 10 is partially pulled through itself, so as to assume a transport position, the clamp assembly 50 is trapped between the tabs 30 and a curved portion 58 of the gasket material. In this orientation, the gasket assembly can then be shipped from the gasket manufacturing site to the concrete casting assembly site, where it will be installed in the cast member. With reference now to FIG. 4, it can be seen that when the gasket body 10 is installed in a cast member 60, the anchoring projections 24 are embedded in the material of the cast member. Now, the gasket body can be pulled all the way through, as is illustrated in FIG. 4.

Figure 5:
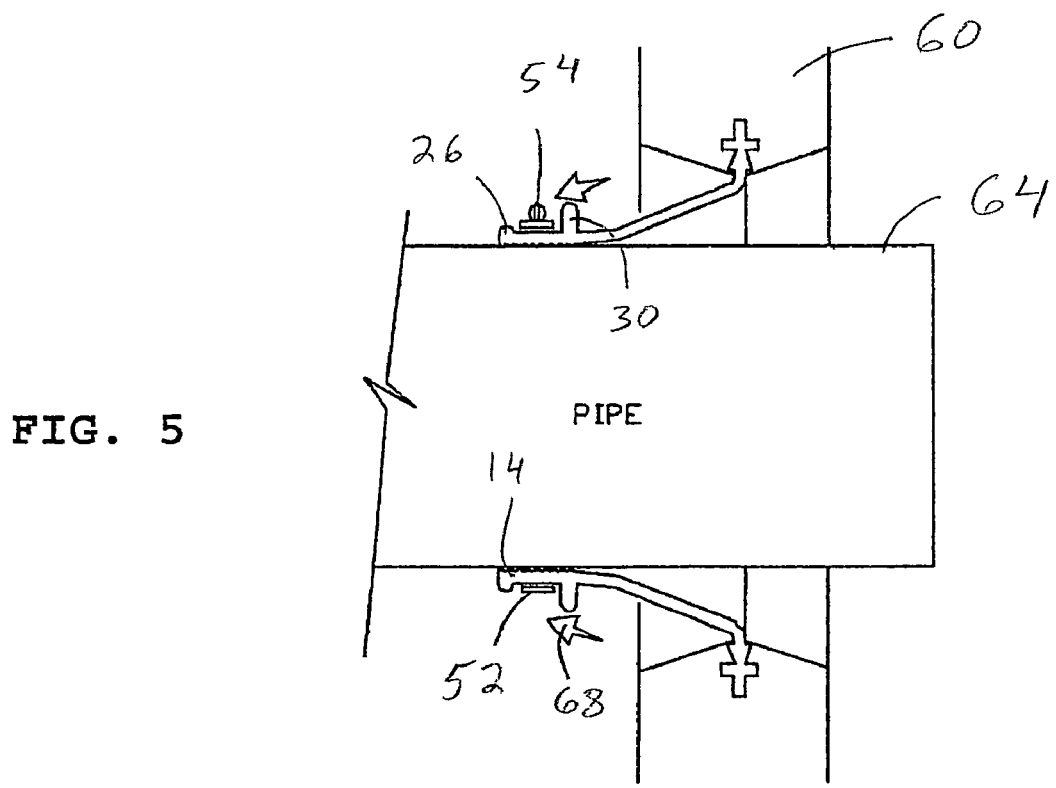
FIG. 5 is a side elevational view in cross section of the gasket assembly of FIG. 4 in a fourth orientation, with a pipe extending through the gasket.

However, in this orientation, the clamp assembly 50 is still not located in its final position. With reference now to FIG. 5, a pipe 64 can be inserted through the opening 62 in the cast member 60 and the gasket pipe engaging end 14. Then, the clamp assembly 50 can be pulled over the tabs 30 and into its final position, adjacent bead 26, as shown by arrows 68. There, it is tightened around the gasket pipe engaging end so that the gasket body 10 seals against the pipe 64 in a liquid-tight manner.

Figure 4:
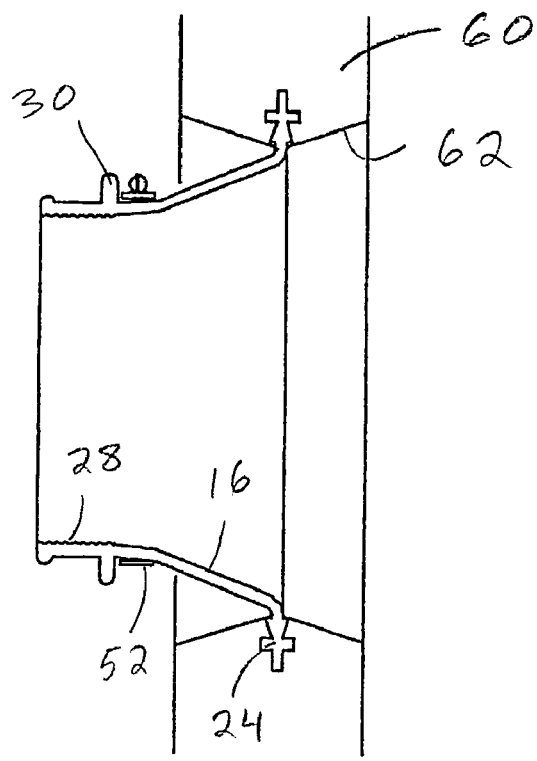
FIG. 4 is a cross sectional view of the gasket assembly of FIG. 1 in a third orientation, as installed on an associated cast member.

Shown in FIG. 3A is an alternate embodiment in which like components are identified by like numerals with a primed suffix (') and a new components are identified by new numerals. FIG. 3A illustrates a gasket body 10' in which a pipe engaging end 14' has been partially pulled through the gasket so as to assume a transport position, as in FIG. 3 discussed hereinbefore. A clamp assembly 50' is located adjacent one of a plurality of tabs 30' such that the clamp assembly 50' is spaced from a bead 26'. Also illustrated in FIG. 3A is a mounting mandrel having two sections 65 and 67. The mandrel is used in the mounting of the gasket assembly 10' in the correct location during the casting of the associated cast member, such as the cast member 60 illustrated in FIG. 4.

While it has been noted that the gasket 14 comprises a resilient material, that material does not have to be of a single durometer. In other words, one could utilize a dual durometer gasket material, in order to enhance the characteristics of the retaining member, for retaining the take down clamp assembly to the gasket in the transport position. For example, the tabs 30 could be made of a harder durometer compound than the remainder of the gasket or connector body 10. This would enhance the ability of the tabs 30 to secure the clamp assembly 50 in position, until the time of installation. Also, a dual durometer material could be employed such that the first and second walls 18 and 20 of the gasket are made of a higher durometer material, to strengthen the wall in order to better resist hydrostatic pressure. At the same time, a lower durometer material can be employed for the spaced ribs 28 of the gasket, to allow a better liquid tight seal to form between the pipe 64, illustrated in FIG. 5, and the gasket 10.

Figure 6:
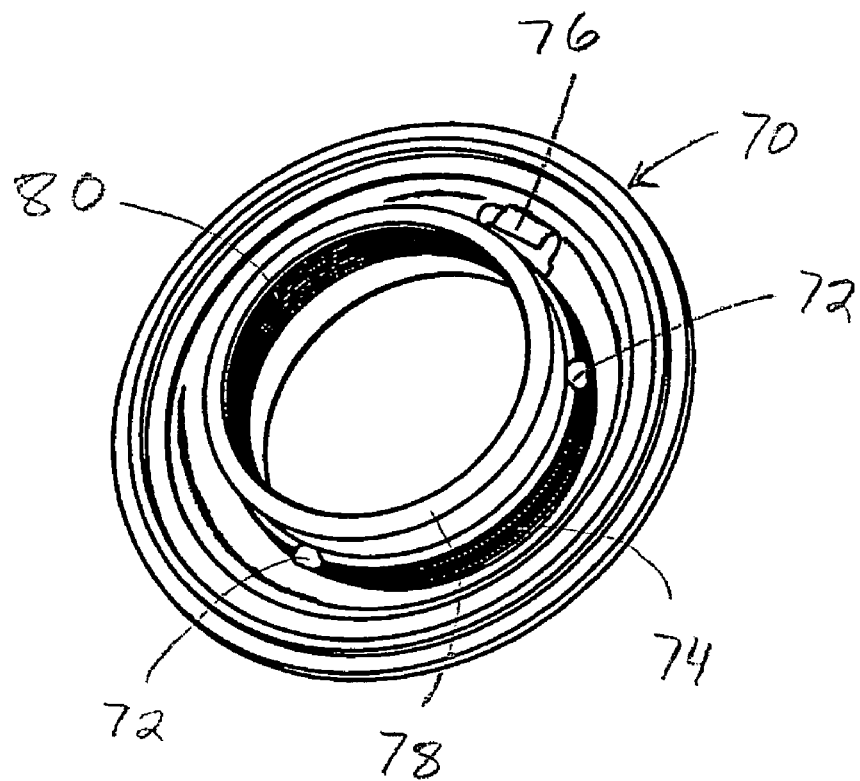
FIG. 6 is a perspective view of a gasket assembly according to a second embodiment of the present invention.

With reference now to FIG. 6, a second embodiment of a gasket assembly is there illustrated. In this embodiment, a gasket body 70 includes integral tabs 72, a clamp band 74 and a tightening screw 76. Spaced from the tabs 72 is a bead 78. Also, ribs 80 can be seen on a surface of the gasket body opposite the surface on which the tabs are located. In this embodiment, three such tabs 72 (the third one not being visible) are located equi-angularly around the gasket body. As with the first embodiment, the tabs 72 hold the clamp band 74 in a transport orientation. The clamp band 74 can subsequently be moved into its use orientation by being moved over the tabs and adjacent the bead 78.

Figure 7:
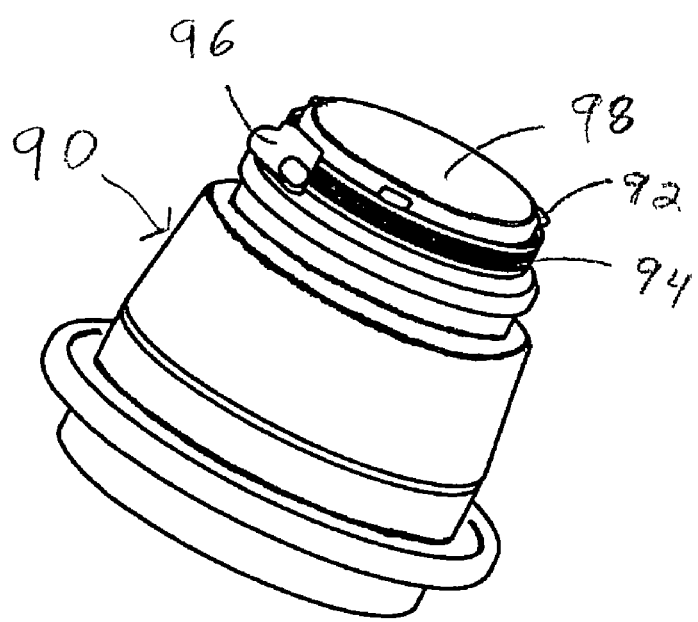
FIG. 7 is a perspective view of a gasket assembly according to a third embodiment of the present invention.

Referring to FIG. 7, a third embodiment of the present invention illustrates a gasket body 90 having tabs 92. In this embodiment also, three such tabs are employed, only two being visible. A clamp band 94 having a tightening screw 96 is located adjacent the tabs 92. This embodiment of the gasket body would be employed in situations where there may not necessarily be a pipe extending through the gasket. In other words, a blind gasket is illustrated. If a pipe is to extend through the gasket, and end wall 98 of the gasket would be removed.

Figure 8:
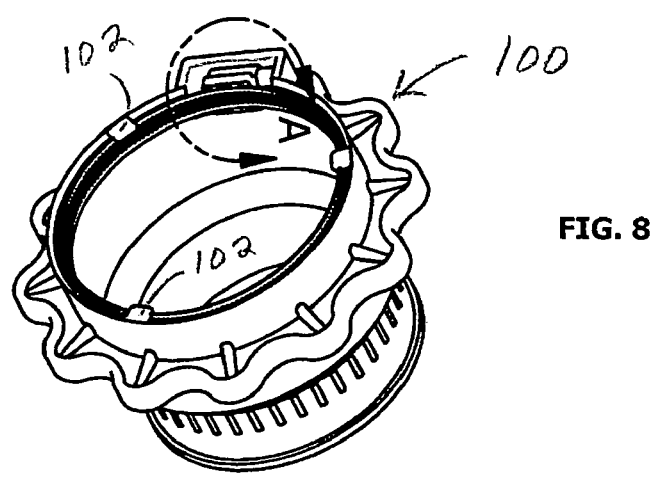
FIG. 8 is a perspective view of a gasket assembly according to a fourth embodiment of the present invention.
Figure 9:
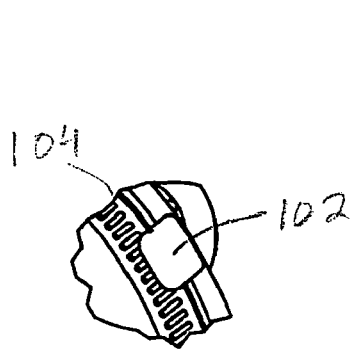
FIG. 9 is an enlarged perspective view of a first portion of the gasket assembly of FIG. 8.
Figure 10:
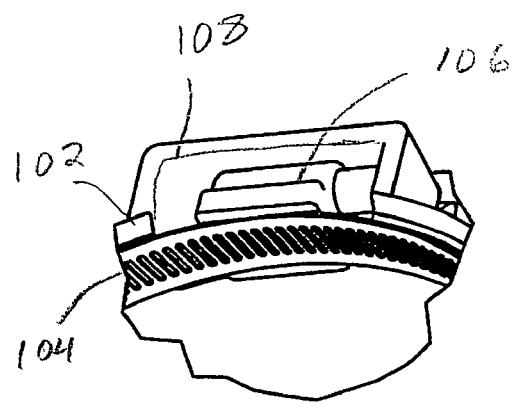
FIG. 10 is an enlarged perspective view of a second portion of the gasket assembly of FIG. 8.
Figure 11:
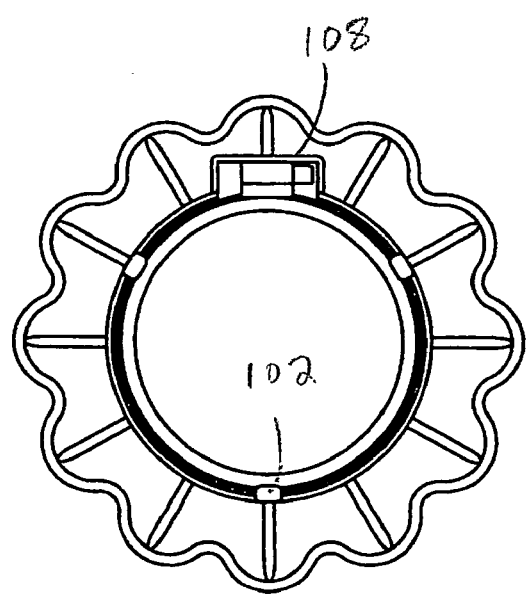
FIG. 11 is a front elevational view of the gasket assembly of FIG. 8.

With reference now to FIG. 8, a fourth embodiment of a gasket assembly according to the present invention is there illustrated. In this embodiment, a gasket body 100 includes tabs 102. As better seen in FIG. 9, located adjacent the tabs is a clamp band 104. In this embodiment also, three such tabs 102 are employed, as shown in FIG. 11. The clamp band includes a tightening screw 106, better illustrated in FIG. 10. The tightening screw is held in a pocket 108 defined in the gasket body 100.

FIG. 12 shows, another embodiment of the present invention. In this embodiment, a gasket body 120 includes a different means for securing the gasket in a transport orientation. Such means comprises a strap 122, better illustrated in FIG. 13. Located adjacent the strap is a band 124 of a clamping assembly. A tightening screw 126 for the band is illustrated in FIG. 12. The tightening screw is held in a pocket 128. As is evident from FIG. 13, the strap includes an aperture 130. When the strap is folded over, a projection 132 protrudes into the aperture 130. In order to aid in the folding process, one or more grooves 134 can be provided in the gasket material at the root of the strap 122. With reference now to FIG. 14, when the strap 122 is folded over and the projection 132 enters the aperture 130, the clamp band 124 is held in a transport orientation or position on the gasket body 120. For the use position or orientation, the strap 122 is unfolded, and the clamping assembly is moved adjacent a bead 134 located on the other end of the gasket body 120.

With reference now to FIG. 15, a further embodiment of the present invention is there illustrated. In this embodiment, a gasket body 140 is provided with a strap 142 located adjacent a clamp band 144. Extending from a surface of the gasket body 140 is an integral loop 146. In this embodiment, a button 148 is located on a free end of the strap. When the strap is pushed through the loop 146, the button will prevent the strap from disengaging from the loop, as is better illustrated in FIG. 16. In this way, the clamp band 144 is held in its transport orientation on the gasket body 140.

Figure 17:
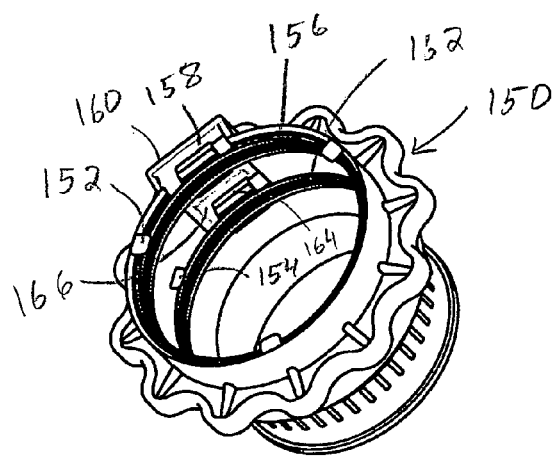
FIG. 17 is a perspective view of a gasket assembly according to a seventh embodiment of the present invention.

Referring to FIG. 17, a further embodiment of the present invention includes a gasket body 150 having a first set of tabs 152 and a second set of tabs 154. The first set of tabs is located adjacent a first clamp band 156, including a first tightening screw 158, which is held in a first pocket 160. A second clamp band 162 is located adjacent the second set of tabs 154. The second clamp band includes a second tightening screw 164, which is housed in a second pocket 166. Thus, the present invention can be employed in multiples when more than one clamp band is employed with the gasket body.

Figure 18:
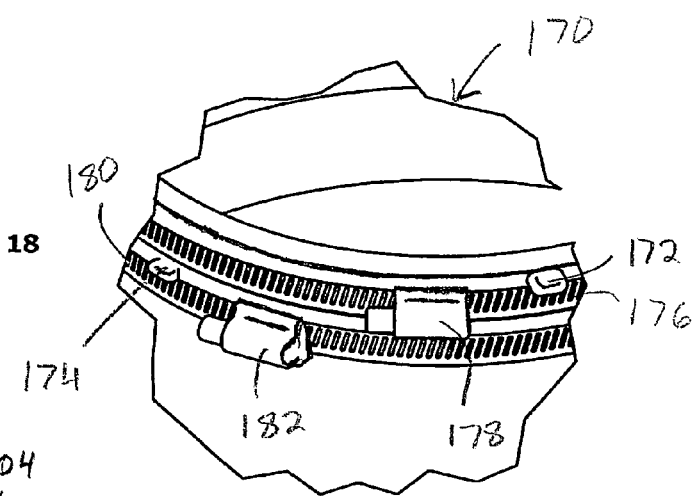
FIG. 18 is a perspective view of a gasket assembly according to an eighth embodiment of the present invention.

With reference now to FIG. 18, another embodiment of the present invention includes gasket body 170 having a first set of tabs 172 and a second set of tabs 174, together with a first clamp band 176, having a first screw 178 and a second clamp band 180, having a second screw 182. In this orientation, the clamp bands are located on an outer surface of the gasket body so that no pockets need be provided for the fasteners or screws of the respective clamp bands. Employing two sets of tabs will allow both clamp bands to be held onto the gasket body 170 for transport purposes. The second set of tabs 174 also serves to separate the second band 180 from the first band 176.

Figure 19:
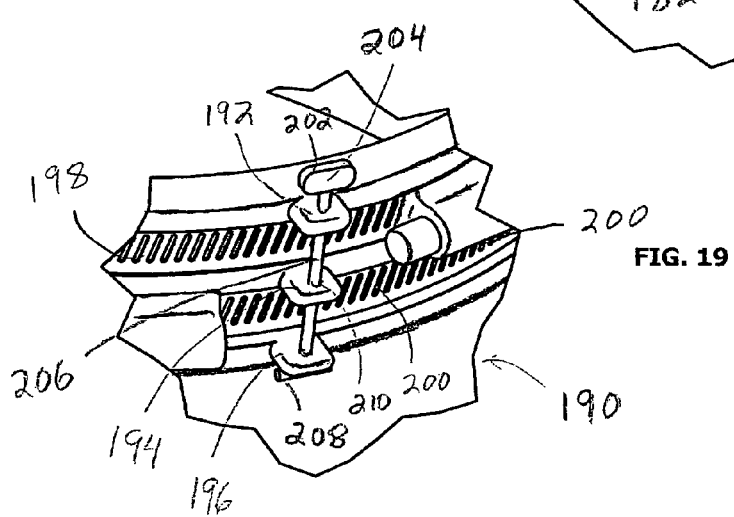
FIG. 19 is a perspective view of a portion of a gasket assembly according to a ninth embodiment of the present invention.

With reference now to FIG. 19, a further embodiment of the present invention includes a gasket body 190 having a first tab 192, a second tab 194 and a third tab 196. In this embodiment, the three tabs are aligned with each other, as is evident. The gasket body 190 accommodates a first band 198 and a second band 200. In this embodiment, a suitable conventional tie 202 can extend through the set of aligned tabs. As discussed previously, the tabs 192-196 could be made of a higher durometer material than the remainder of the gasket, in order to enhance the characteristics of the retaining member to secure the take down clamp during shipment. It should be appreciated that such dual durometer design could be employed on any of the embodiments discussed herein.

The tie includes a first protrusion 204 on a first end thereof, an elongated section 206 and a second protrusion 208 at its opposite end. Suitable apertures 210 in the aligned tabs allow for the elongated section of the tie to extend through the tabs, thereby holding the first and second bands 198 and 200 in position on the gasket body for transport purposes. When the bands need to be moved to their use position, the tie 202 can simply be cut. Then, the bands can be moved from their transport position to their use position.

While FIG. 19 illustrates an embodiment in which three tabs are aligned with each other, it should be appreciated that a further embodiment could only have two tabs aligned with each other. Such an embodiment would accommodate a single band when only a single band is called for in connection with securing the gasket body and around a pipe.

Figure 20:
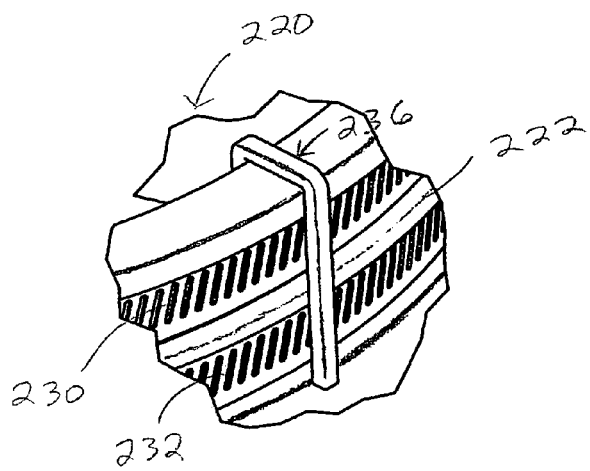
FIG. 20 is a perspective view of a portion of a gasket assembly according to a tenth embodiment of the present invention.
Figure 21:
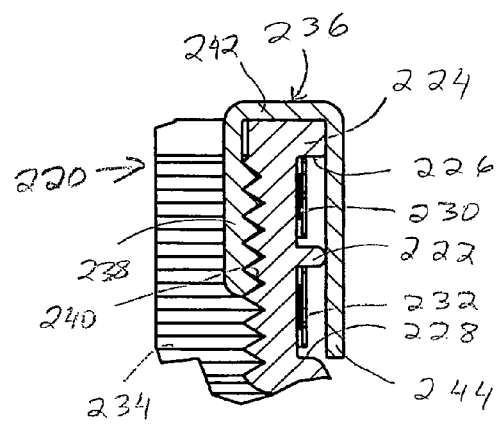
FIG. 21 is a side elevational view in cross section of the gasket assembly of FIG. 20.

A further embodiment of the present invention is shown in FIG. 20. It includes a gasket body 220 having a rib 222 and, spaced therefrom, an enlarged end 224. A first groove 226 and a second groove 228 are thereby defined in the material of the gasket body, as is illustrated in FIG. 21. A first band 230 is accommodated in a first groove and a second band 232 is accommodated in the second groove. Suitable ribs 234 are formed on a face of the gasket body, opposite the face on which the grooves are located.

In this embodiment, a somewhat U-shaped fastener 236 is employed for holding the bands in place for transport purposes. The fastener includes a first leg 238, which accommodates the ribs via suitable corresponding grooves 240. The fastener also includes an intermediate portion or base 242 and a second leg 244. In this embodiment, the second leg extends over the grooves 226 and 228 and the respective bands held therein.

Figure 22:
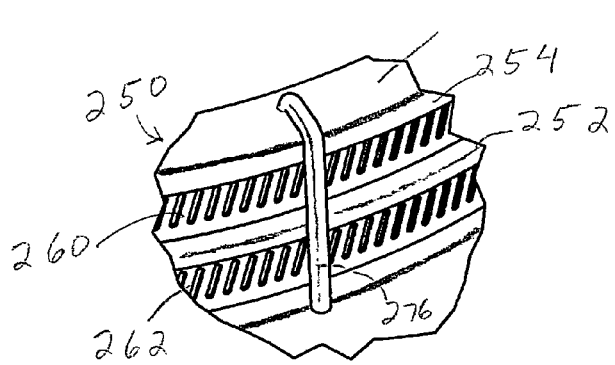
FIG. 22 is a perspective view of a portion of a gasket assembly according to an eleventh embodiment of the present invention.
Figure 23:
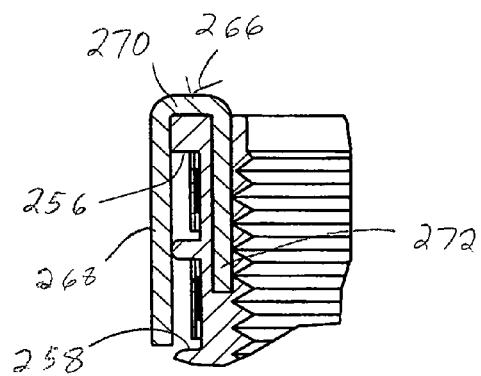
FIG. 23 is a side elevational view in cross section of the gasket assembly of FIG. 22, in a reversed orientation.

With reference now to FIG. 22, a further embodiment of the present invention is there illustrated. In this embodiment, a gasket body 250 includes a rib 252 and an enlarged end 254. First and second grooves 256 and 258 are defined in the gasket body for respectively accommodating a first band 260 and a second band 262. In this embodiment, a fastener 266 is employed for holding the bands in place for transport. The fastener, which can be U-shaped, includes a first leg 268, an intermediate portion or base 270 and a second leg 272. In this embodiment, the fastener second leg 272 is pushed into the material of the gasket body. To allow the bands to be placed in their use orientation, the fastener would simply be removed. In this way, the bands can be tightened onto the pipe extending through the pipe engaging end of the gasket body.

Figure 24:
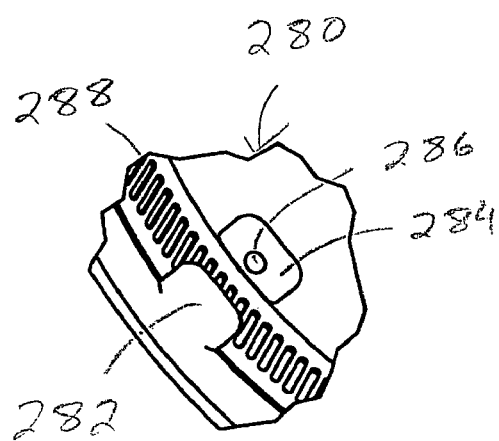
FIG. 24 is a perspective view of a portion of a gasket assembly according to a twelfth embodiment of the present invention.
Figure 25:
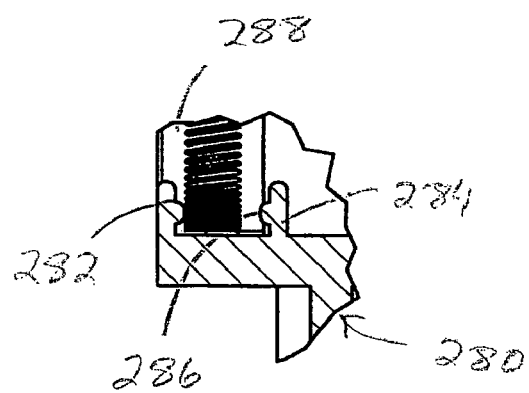
FIG. 25 is a side elevational view in cross section of the gasket assembly of FIG. 24.

A further embodiment of the present invention is illustrated in FIG. 24. In this embodiment, a gasket body 280 includes spaced first and second tabs 282 and 284. Each of these tabs includes a button or a protrusion 286, as is evident from FIG. 25. A suitable clamping band 288 is held between the tabs. The band is restrained from falling out of the gasket body, due to the presence of the buttons or protrusions on the tabs.

Figure 26:
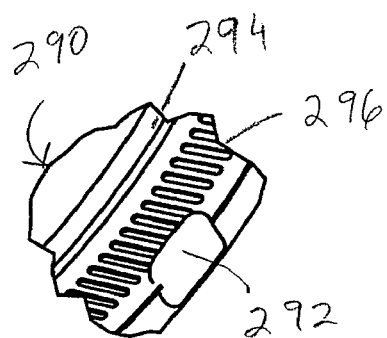
FIG. 26 is a perspective view of a thirteenth embodiment of a gasket assembly according to the present invention.

With reference now to FIG. 26, a further embodiment of the present invention is there illustrated. In this embodiment, a gasket body 290 includes a tab 292. Spaced therefrom is a rib 294. A clamping band 296 is held between the rib and the tab.

Figure 27:
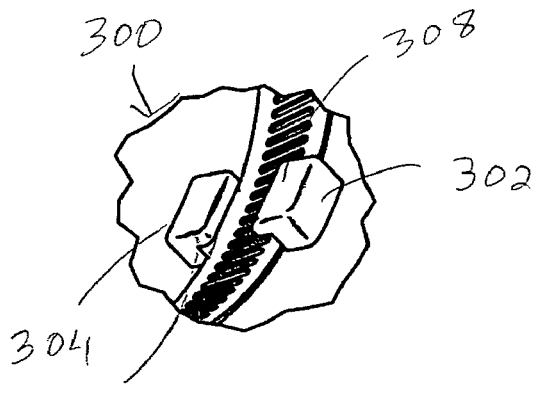
FIG. 27 is a perspective view of a fourteenth embodiment of a gasket assembly according to the present invention.

Referring to FIG. 27, a further embodiment of the present invention includes a gasket body 300. Protruding therefrom are a pair of spaced tabs 302 and 304. Each of these includes a respective flange 306, which extends partially over a clamping band 308. The flanges prevent or retard the band 308 from falling away from the gasket body 300.

With reference now to FIG. 28, a further embodiment of a gasket body 310 according to the present invention is there illustrated. In this embodiment, the gasket body includes three equidistantly spaced tabs 312 for restraining a clamping band 314. The gasket body includes a pocket 316 for accommodating a tightening screw 318 of the band. In this embodiment, the clamp assembly would be removed from the transport position, illustrated in FIG. 28 and used on the pipe receiving end of the gasket, as has been previously described.

With reference now to FIG. 29, a gasket body 320 according to another embodiment of the present invention includes a plurality of tabs 322. Three such tabs are illustrated, positioned at 120° intervals around the gasket body. A clamping band 324 is mounted onto the gasket body adjacent the tabs. Note that a reduced diameter portion 326 of the gasket body accommodates the clamping band 324. In this embodiment, an end face 327 of the gasket body is closed. Needless to say, the gasket end face would be removed if a pipe is meant to extend through the gasket body.

Referring to FIG. 30, a further embodiment of the present invention includes a gasket body 330. Protruding therefrom are a plurality of tabs 332. Three such tabs are illustrated in FIG. 30. A band 334 is held to the gasket body adjacent the tabs 332.

Figure 31:
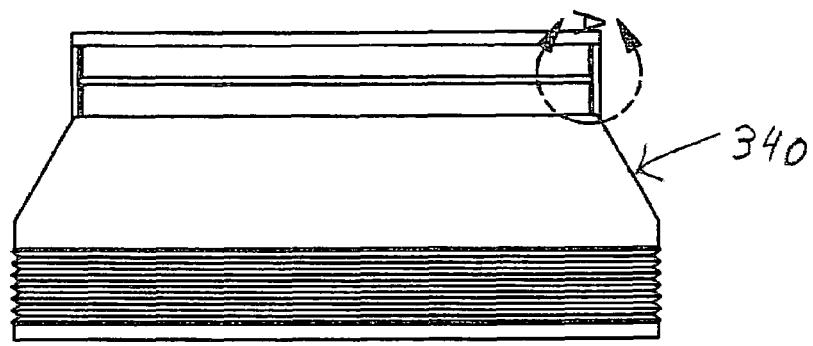
FIG. 31 is a side elevational view of a gasket assembly according to an eighteenth embodiment of the present invention.
Figure 32:
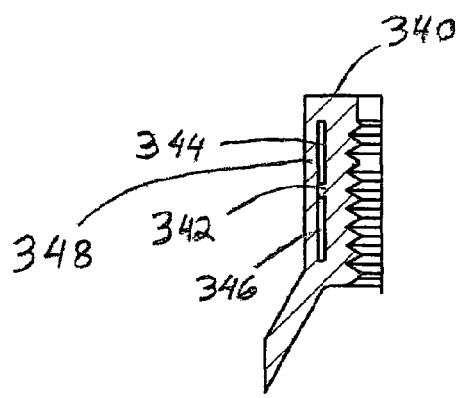
FIG. 32 is an enlarged side elevational view in cross section of a portion of the gasket assembly of FIG. 31, in a reversed orientation; and, FIG. 33 is a perspective view of a gasket assembly according to a nineteenth embodiment of the present invention.

With reference now to FIG. 31, a penultimate embodiment of the present invention includes gasket body 340. With reference now also to FIG. 32, a rib 342 is defined on a surface of the gasket body. A pair of grooves 344 and 346 are defined in the material of the gasket body. These are located on either side of the rib. A strap 348, which can comprise the gasket body material, extends over the grooves. The strap can be on the order of ½ inch wide. Two such straps or loops could be positioned 180° from each other on the gasket body. In this way, the clamping assembly (not illustrated in FIGS. 31 and 32) could be accommodated in the transport position and held to the gasket body.

Figure 33:
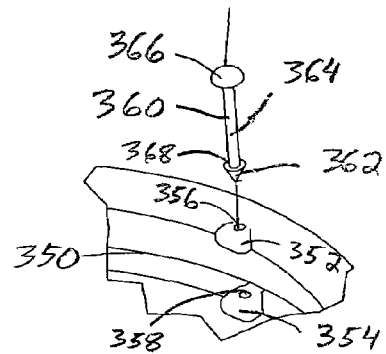

With reference now to FIG. 33, a still yet further embodiment of the present invention comprises a gasket 350 which includes a pair of spaced and aligned tabs 352 and 354. In this embodiment, each tab is manufactured with a through hole or aperture 356 and 358, respectively. A suitable conventional push pin 360 can be employed in this embodiment. More particularly, the push pin can include a tapered tip 362 which can protrude through the aligned apertures 356 and 358, a stem portion 364 and a bulbous head portion 366. When the push pin extends through the tabs, a clamping band (not illustrated in this embodiment) extending between the tabs, is held in place on the gasket body 350. The push pin is prevented from being pulled out of the tabs due to the presence of an enlarged proximal end or shoulder 368 of the tip 362. It resists being pulled back through the tabs. To remove the push pin, it can be simply cut away. In one embodiment, the push pin can be formed from a suitable conventional plastic or metal material.

Disclosed herein has been a gasket assembly including a gasket and a clamp assembly for use on a pipe engaging end of the gasket. The gasket includes a retaining means, of one piece with a gasket, and extending from a wall of a gasket for retaining the clamp assembly to the gasket in a transport position. A variety of retaining means has been disclosed. These include tabs spaced circumferentially around the gasket body, aligned tabs, through which a tie selectively extends, as well as a variety of straps. Also presented have been fasteners which cooperate with the retaining means to retain the clamp assembly in a transport position on the gasket. Such fasteners would be removed in order to allow the clamp to assume a use position or orientation. In all of these designs, the retaining means is of one piece with the gasket so that it can be molded as the gasket is molded. Thus, the disclosed embodiments eliminate the need for using a separate tie wrap, such as is disclosed in the U.S. Pat. No. 6,921,085 patent, for holding a takedown clamp to the gasket before the clamp is mounted to the gasket in the use position.

The invention has been described with reference to several preferred embodiments. Obviously, modifications and alterations will occur to others upon a reading and understanding of this specification. It is intended to include all such modifications and alterations in so far as they come within the scope of the appended claims or the equivalents thereof.

The invention claimed is:

1. A gasket assembly comprising:
   a gasket, made of resilient material, including an annular mounting end for mounting to an opening of an associated cast member, a pipe engaging end for receiving an associated pipe and an intermediate section located between said mounting end and said pipe engaging end;
   a take-down clamp assembly for use with said gasket adjacent said pipe engaging end of said gasket;
   a retaining member, of one piece with said gasket, for retaining said take-down clamp assembly to said gasket in a transport position; and
   a fastener which extends through an aperture in said retaining member, wherein said fastener comprises a first protrusion located adjacent one end thereof and a second protrusion located adjacent another end thereof.

2. The assembly of claim 1 wherein said gasket comprises a dual durometer material.

3. The assembly of claim 1 wherein said retaining member comprises at least one tab.

4. The assembly of claim 3 wherein said retaining member further comprises a protrusion extending away from said at least one tab.

5. The assembly of claim 1 wherein said retaining member comprises a strap which extends over a preselected width of an annular groove defined in a wall of said gasket.

6. The assembly of claim 1 wherein said fastener comprises a metal material.

7. The assembly of claim 1 wherein said fastener comprises a plastic material.

8. The assembly of claim 1 wherein said retaining member comprises a tab.

9. The assembly of claim 1 wherein said retaining member comprises a pair of aligned tabs spaced from each other.

10. A gasket assembly for joining together a pipe and an enclosure body having an opening formed therein, the gasket assembly comprising:
    a one piece elastomeric gasket which assumes a first, transport, orientation and a second, use, orientation, said gasket comprising:
       a larger end for mounting to an opening of an associated enclosure body via an anchoring projection,
       a smaller end for receiving an associated pipe, and
       a tapered central section located between said ends;
    a clamping member, which in the use orientation of said gasket extends around said gasket adjacent said smaller end of said gasket for clamping around the associated pipe;
    a retaining member, of one piece with said gasket, for retaining said clamping member to said gasket in the transport orientation of said gasket; and,
    a fastener mounted to said retaining member and extending over said clamping member, said fastener cooperating with said retaining member to keen said clamping member in place, said fastener comprising a first protrusion located adjacent one end thereof and a second protrusion located adjacent another end thereof.

11. The assembly of claim 10 wherein said retaining member comprises at least one tab protruding from a wall of said gasket.

12. The assembly of claim 10 wherein said retaining member comprises a pair of aligned tabs spaced from each other.

* * * * *